United States Patent [19]

Etzbach et al.

[11] Patent Number: 5,853,432
[45] Date of Patent: Dec. 29, 1998

[54] DYE MIXTURES COMPRISING METHINE AND ANTHRAQUINONE DYES

[75] Inventors: Karl-Heinz Etzbach, Frankenthal; Rüdiger Sens, Mannheim, both of Germany

[73] Assignee: BASF Aktiengesellschaft, Ludwigshafen, Germany

[21] Appl. No.: 703,551

[22] Filed: Aug. 27, 1996

[30] Foreign Application Priority Data

Sep. 7, 1995 [DE] Germany .................. 195 33 026.9

[51] Int. Cl.⁶ .................. C09B 67/22; B41M 5/035
[52] U.S. Cl. .................. 8/643; 8/639; 8/691; 8/471
[58] Field of Search .................. 8/471, 638–643, 8/691

[56] References Cited

U.S. PATENT DOCUMENTS

| | | | |
|---|---|---|---|
| 5,079,365 | 1/1992 | Sens et al. .................. | 546/119 |
| 5,132,268 | 7/1992 | Chapman et al. . | |
| 5,132,438 | 7/1992 | Bach et al. .................. | 552/295 |
| 5,147,845 | 9/1992 | Sens et al. .................. | 503/227 |
| 5,283,326 | 2/1994 | Hansen et al. .................. | 534/766 |
| 5,376,150 | 12/1994 | Lange et al. .................. | 8/638 |
| 5,545,235 | 8/1996 | Sens et al. .................. | 8/471 |

FOREIGN PATENT DOCUMENTS

| | | |
|---|---|---|
| 0 399 473 | 5/1990 | European Pat. Off. . |
| 0 416 434 | 3/1991 | European Pat. Off. . |
| 0 569 784 | 11/1993 | European Pat. Off. . |
| 0 591 736 | 4/1994 | European Pat. Off. . |
| 0 680 834 | 11/1995 | European Pat. Off. . |
| 44 03 083 | 8/1995 | Germany . |
| WO 95/17470 | 6/1995 | WIPO . |
| WO 95/22581 | 8/1995 | WIPO . |
| WO 96/03462 | 2/1996 | WIPO . |

OTHER PUBLICATIONS

The Chemistry of Synthetic Dyes, vol. III, pp. 391–413, 1970, J.M. Straley, "Disperse Dyes".

*Primary Examiner*—Margaret Einsmann
*Attorney, Agent, or Firm*—Oblon, Spivak, McClelland, Maier & Neustadt, P.C.

[57] ABSTRACT

Dye mixtures comprising one or more pyridone dyes of the formula

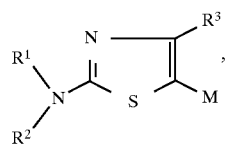

where M is a pyridone or triazolopyridone radical which is bonded to the thiazole ring via CH and the other radicals are each as defined in the description, and one or more dyes based on 1-aminoanthraquinone are useful for thermal transfer.

6 Claims, No Drawings

DYE MIXTURES COMPRISING METHINE AND ANTHRAQUINONE DYES

The present invention relates to novel dye mixtures comprising one or more pyridone dyes of the formula I

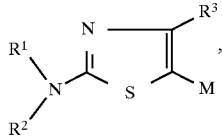

where

M is a radical of the formula

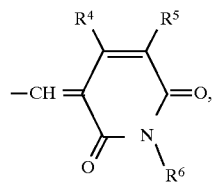

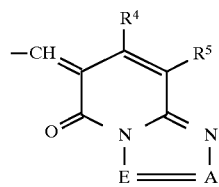

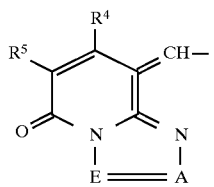

$R^1$ and $R^2$ are independently of each other $C_1$–$C_{10}$-alkyl with or without substitution by $C_1$–$C_4$-alkoxycarbonyl, $C_1$–$C_4$-alkoxycarbonyloxy, whose alkyl chain may in each case be interrupted by an oxygen atom in ether function, or phenyl and with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy-, halogen- or nitro-substituted phenyl, or together with the nitrogen atom joining them together a 5- or 6-membered saturated heterocyclic radical with or without further heteroatoms, $R^3$ is tert-butyl or tert-pentyl when M is a radical of the formula IIa or $C_3$–$C_{10}$-alkyl, $C_5$–$C_7$-cycloalkyl, unsubstituted or $C_1$–$C_4$-alkyl-, $C_1$–$C_4$-alkoxy-, halogen- or nitro-substituted phenyl or thienyl when M is a radical of the formula IIb or IIc, $R^4$ is hydrogen, $C_1$–$C_6$-alkyl or unsubstituted or $C_1$–$C_4$-alkyl-, $C_1$–$C_4$-alkoxy-, halogen- or nitro-substituted phenyl, $R^5$ is cyano, carbamoyl, mono- or di($C_1$–$C_8$-alkyl)carbamoyl, carboxyl, $C_1$–$C_8$-alkoxycarbonyl or benzimidazolyl, $R^6$ is $C_1$–$C_{10}$-alkyl with or without substitution by phenyl, phenoxy, cyclohexyloxy or pyrazolyl and with or without interruption by from 1 to 4 oxygen atoms in ether function, $C_5$–$C_7$-cycloalkyl, unsubstituted or $C_1$–$C_4$-alkyl-, $C_1$–$C_4$-alkoxy-, halogen- or nitro-substituted phenyl or a radical of the formula $NB^1B^2$ where $B^1$ and $B^2$ are independently of each other hydrogen, $C_1$–$C_{10}$- alkyl, unsubstituted or $C_1$–$C_4$-alkyl-, $C_1$–$C_4$-alkoxy-, halogen- or nitro-substituted phenyl, $C_1$–$C_9$-alkanoyl, $C_1$–$C_8$-alkylsulfonyl, unsubstituted or $C_1$–$C_4$-alkyl-, $C_1$–$C_4$-alkoxy-, halogen- or nitro-substituted phenylsulfonyl, pyridylsulfonyl, unsubstituted or $C_1$–$C_4$-alkyl-, $C_1$–$C_4$-alkoxy-, halogen- or nitro-substituted benzoyl, pyridylcarbonyl or thienylcarbonyl, and one of the two radicals A or E is nitrogen and the other is a radical of the formula C—$R^7$ where $R^7$ is $C_1$–$C_{10}$-alkyl with or without substitution by phenyl, phenoxy, cyclohexyloxy or pyrazolyl and with or without interruption by from 1 to 4 oxygen atoms in ether function, $C_5$–$C_7$-cycloalkyl or unsubstituted or $C_1$–$C_4$-alkyl-, $C_1$–$C_4$-alkoxy-, halogen- or nitro-substituted phenyl, and one or more anthraquinone dyes of the formula III

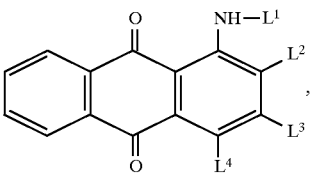

where $L^1$ is hydrogen, $C_1$–$C_{10}$-alkyl or unsubstituted or $C_1$–$C_4$-alkyl-, $C_1$–$C_4$-alkoxy-, halogen- or nitro-substituted phenyl, $L^2$ and $L^3$ are independently of each other hydrogen, unsubstituted or phenyl- or $C_1$–$C_4$-alkylphenyl-substituted $C_1$–$C_{10}$-alkoxy, unsubstituted or phenyl-substituted $C_1$–$C_{10}$-alkylthio, halogen, hydroxyphenyl, $C_1$–$C_4$-alkoxyphenyl or a radical of the formula

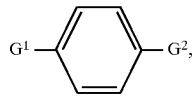

where $G^1$ is oxygen or sulfur and $G^2$ is hydrogen or $C_1$–$C_8$-monoalkylsulfamoyl whose alkyl chain may be interrupted by 1 or 2 oxygen atoms in ether function, and $L^4$ is amino, hydroxyl or unsubstituted or phenyl-substituted $C_1$–$C_{10}$-alkylthio, and a method for the thermal transfer of these dyes.

In the thermal transfer printing process, a transfer sheet comprising a thermally transferable dye in one or more binders with or without suitable auxiliaries on a support is heated from the back with an energy source, for example with a thermal head or a laser, for short periods (duration: fractions of a second), causing the dye to migrate out of the transfer sheet and diffuse into the surface coating of a receiving medium. The essential advantage of this process is that the amount of dye to be transferred (and hence the color gradation) is easy to control by controlling the energy to be emitted by the energy source.

Generally, color recording is carried out using the three subtractive primaries of yellow, magenta and cyan (with or without black).

It is known to carry out the thermal transfer printing process 40 with individual dyes or else with mixtures of dyes. However, it has been found that the dyes used frequently still have application defects.

It is an object of the present invention to provide novel dye mixtures in the red region, especially in the magenta region, which shall be advantageous for thermal transfer.

We have found that this object is achieved by the dye mixtures defined at the beginning.

Any alkyl and alkenyl appearing in the abovementioned formulae may be straight-chain or branched.

In any substituted alkyl appearing in the abovementioned formulae the number of substituents is generally 1 or 2.

In any substituted phenyl, pyridyl or thienyl appearing in the abovementioned formulae the number of substituents is generally from 1 to 3, preferably 1 or 2.

There follows an exemplary enumeration of radicals. This list also includes radicals present in the formula IV below.

$B^1$, $B^2$, $L^1$, $R^1$, $R^2$, $R^4$, $R^6$, $R^7$, W, $Y^1$, $Y^2$, $Y^4$, $Y^5$, $y^6$, $Y^7$, $Y^8$, $Z^2$, $Z^3$, $Z^4$ and $Z^5$ are each for example methyl or ethyl.

$R^3$ and $Y^3$ as well as $B^1$, $B^2$, $L^1$, $R^1$, $R^2$, $R^4$, $R^6$, $R^7$, $Y^1$, $Y^2$, $Y^4$, $Y^5$, $Y^6$, $Y^7$, $Y^8$, $Z^2$, $Z^3$, $Z^4$ and $Z^5$ are each propyl, isopropyl, butyl, isobutyl, sec-butyl, tert-butyl, pentyl, isopentyl, neopentyl, tert-pentyl, hexyl or 2-methylpentyl.

$B^1$, $B^2$, $L^1$, $R^1$, $R^2$, $R^3$, $R^6$, $R^7$, W, $Y^1$, $Y^2$, $Y^3$, $Y^4$, $Y^6$, $Y^7$ and $Y^8$ may also each be for example, heptyl, octyl, 2-ethylhexyl, isooctyl, nonyl, isononyl, decyl or isodecyl (the designations isooctyl, isononyl and isodecyl are trivial names derived from the oxo process alcohols—cf. Ullmann's Encyclopedia of Industrial Chemistry, $5^{th}$ Edition, Vol. A 1, pages 290 to 293, and Vol. A 10, pages 284 and 285).

$R^1$, $R^2$, $R^3$, $R^6$, $R^7$, $Y^1$, $Y^2$, $Y^3$, $Y^6$ and $Y^7$ may also each be for example cyclopentyl, methylcyclopentyl, dimethylcyclopentyl, cyclohexyl, methylcyclohexyl or cycloheptyl.

$R^1$, $R^2$, $R^6$, $R^7$, W, $Y^1$, $Y^2$, $Y^4$, $Y^6$, $Y^7$ and $Y^8$ may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2-or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxyundecyl, 3,6,9,12-tetraoxatridecyl or 3,6,9,12-tetraoxatetradecyl.

$R^1$, $R^2$, $Y^1$, $Y^2$, $Y^6$ and $Y^7$ may each also be for example 2-methoxycarbonylethyl, 2-ethoxycarbonylethyl, 2-propoxycarbonylethyl, 2-isopropoxycarbonylethyl, 2-butoxycarbonylethyl, 2- or 3-methoxycarbonylpropyl, 2- or 3-ethoxycarbonylpropyl, 2- or 3-propoxycarbonylpropyl, 2- or 3-butoxycarbonylpropyl, 2- or 4-methoxycarbonylbutyl, 2- or 4-ethoxycarbonylbutyl, 2- or 4-propoxycarbonylbutyl, 2- or 4-butoxycarbonylbutyl, 2-methoxycarbonyloxyethyl, 2-ethoxycarbonyloxyethyl, 2-propoxycarbonyloxyethyl, 2-isopropoxycarbonyloxyethyl, 2-butoxycarbonyloxyethyl, 2- or 3-methoxycarbonyloxypropyl, 2- or 3-ethoxycarbonyloxypropyl, 2- or 3-propoxycarbonyloxypropyl, 2- or 3-butoxycarbonyloxypropyl, 2- or 4-methoxycarbonyloxybutyl, 2- or 4-ethoxycarbonyloxybutyl, 2- or 4-propoxycarbonyloxybutyl, 2- or 4-butoxycarbonyloxybutyl, prop-1-en-3-yl but-2-en-4-yl or 2-methylpropyl-1-en-3-yl.

$R^6$ and $R^7$ may each also be for example 2-benzyloxyethyl, 2-(pyrazol-1-yl)ethyl, 2- or 3-benzyloxypropyl, 2- or 3-(pyrazol-1-yl)propyl, 2- or 4-benzyloxybutyl, 2- or 4-(pyrazol-1-yl)butyl, 2-phenoxyethyl, 2- or 3-phenoxypropyl, 2- or 4-phenoxybutyl, 2-cyclohexyloxyethyl, 2- or 3-cyclohexyloxypropyl or 2- or 4-cyclohexyloxybutyl.

$R^1$ and $R^2$ may each also be for example 2-cyanoethyl, 2- or 3-cyanopropyl, 2- or 4-cyanobutyl, 2-hydroxyethyl, 2- or 3-hydroxypropyl, 2- or 4-hydroxybutyl, 2-chloroethyl, 2- or 3-chloropropyl, 2- or 4-chlorobutyl 2-acetyloxyethyl, 2- or 3-acetyloxypropyl, 2- or 4-acetyloxybutyl, 2-propionyloxyethyl, 2- or 3-propionyloxypropyl or 2- or 4-propionyloxybutyl.

$R^1$, $R^2$, $R^6$, $R^7$, $Y^1$, $Y^2$, $Y^6$, $Y^7$ and $Z^2$ may each also be for example benzyl or 1- or 2-phenylethyl.

$B^1$, $B^2$, $L^1$, $R^1$, $R^2$, $R^3$, $R^4$, $R^6$, $R^7$, $Y^1$, $Y^2$, $Y^3$, $Y^6$, $Y^7$ and $Z^2$ may each also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,3-, 2,4- or 2,6-dimethylphenyl, 2-, 3- or 4-methoxyphenyl, 2-, 3- or 4-ethoxyphenyl, 2,3-, 2,4- or 2,6-dimethoxyphenyl, 2-, 3- or 4-fluorophenyl, 2-, 3- or 4-chlorophenyl, 2-, 3- or 4-bromophenyl or 2-, 3- or 4-nitrophenyl.

$R^5$ is for example mono- or dimethylcarbamoyl, mono- or diethylcarbamoyl, mono- or dipropylcarbamoyl, mono- or diisopropylcarbamoyl, mono- or dibutylcarbamoyl, mono- or dipentylcarbamoyl, mono- or dihexylcarbamoyl, mono- or diheptylcarbamoyl, mono- or dioctylcarbamoyl, mono- or bis(2-ethylhexyl)carbamoyl or N-methyl-N-ethylcarbamoyl.

$L^2$, $L^3$, $L^4$ and $Z^2$ may each also be for example methylthio, ethylthio, propylthio, isopropylthio, butylthio, isobutylthio, pentylthio, hexylthio, heptylthio, octylthio, isooctylthio, 2-ethylhexylthio, nonylthio, isononylthio, decylthio, isodecylthio, benzylthio or 1- or 2-phenylethylthio.

$L^2$, $L^3$, $Y^4$, $Y^5$, $Z^2$, $Z^3$, $Z^4$ and $Z^5$ may each also be for example methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

$L^2$, $L^3$ and $Z^2$ may each also be for example heptyloxy, octyloxy, isooctyloxy, 2-ethylhexyloxy, nonyloxy, isononyloxy, decyloxy or isodecyloxy.

$L^2$, $L^3$ and $Z^2$ may each also be for example benzyloxy or 1- or 2-phenylethoxy.

$L^2$ and $L^3$ may each also be for example 2-, 3-, or 4-hydroxyphenyl, 2-, 3- or 4-methoxyphenyl, 2-, 3- or 4-ethoxyphenyl, 2-, 3- or 4-propoxyphenyl, 2-, 3- or 4-isopropoxyphenyl or 2-, 3- or 4-butoxyphenyl.

$Z^2$ as well as $L^2$, $L^3$, $Z^3$, $Z^4$ and $Z^5$, is for example fluorine, chlorine or bromine.

$B^1$, $B^2$, $Z^3$, $Z^4$ and $Z^5$ may each also be for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, heptylsulfonyl, octylsulfonyl, 2-ethylhexylsulfonyl, phenylsulfonyl, 2-methylphenylsulfonyl, 2-methoxyphenylsulfonyl,or 2-chlorophenylsulfonyl.

$R^5$, $Z^3$, $Z^4$ and $Z^5$ may each also be for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl, hexyloxycarbonyl, heptyloxycarbonyl, octyloxycarbonyl, isooctyloxycarbonyl or 2-ethylhexyloxycarbonyl.

$Z^3$, $Z^4$ and $Z^5$ may each also be for example 2-phenoxyethoxycarbonyl, 2- or 3-phenoxypropoxycarbonyl or 2- or 4-phenoxybutoxycarbonyl.

$Z^2$ may also be for example 2- or 3-methylthienyl or 2-, 3- or 4-methylpyridyl.

$B^1$, $B^2$ and $Z^1$ may each also be for example formyl, acetyl, propionyl, butyryl, pentanoyl or hexanoyl.

$B^1$ and $B^2$ may each also be heptanoyl, octanoyl, 2-ethylhexanoyl, isooctanoyl, nonanoyl, isononanoyl, benzoyl, 2-, 3- or 4-methylbenzene or 2-, 3- or 4-methoxybenzoyl.

$Y^4$ may also be for example acetylamino, propionylamino, methoxyacetylamino, benzoylamino, methoxycarbonylamino, ethoxycarbonylamino, methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono- or dipropylaminosulfonylamino, mono- or diisopropylaminosulfonylamino, mono- or dibutylaminosulfonylamino or (N-methyl-N-ethylaminosulfonyl)amino.

$G^2$ is for example methylsulfamoyl, ethylsulfamoyl, propylsulfamoyl, isopropylsulfamoyl, butylsulfamoyl, pentylsulfamoyl, hexylsulfamoyl, heptylsulfamoyl, octylsulfamoyl, 2-ethylsulfamoyl, 2-methoxyethylsulfamoyl, 2-ethoxyethylsulfamoyl, 3,6-dioxaheptylsulfamoyl, 3,6-dioxaoctylsulfamoyl, 4,8-dioxanonylsulfamoyl, 3,7-dioxaoctylsulfamoyl, 3,7-dioxanonylsulfamoyl, 4,7-dioxaoctylsulfamoyl, 4,7-dioxanonylsulfamoyl or 4,8-dioxadecylsulfamoyl.

$R^1$ and $R^2$, $Y^1$ and $Y^2$ or $Y^6$ and $Y^7$ each combined with the nitrogen atom joining them together into a 5- or 6-membered saturated heterocyclic radical with or without further heteroatoms may be, for example pyrrolidinyl, piperidinyl, morpholinyl, thiomorpholinyl, thiomorpholinyl-S,S-dioxide, piperazinyl or N-($C_1$–$C_4$-alkyl)piperazinyl, such as N-methyl- or N-ethyl-piperazinyl.

When $R^1$ and $R^2$ in the formula I are each $C_1$–$C_{10}$-alkyl, or when one of $R^1$ and $R^2$ is $C_1$–$C_{10}$-alkyl and the other is $C_5$–$C_7$-cycloalkyl, then preference is given to those pyridone dyes in the dye mixtures in which the sum of the carbon atoms present in the two radicals $R^1$ and $R^2$ is at least 7, preferably at least 8.

When M in the formula I is a radical of the formula IIb or IIc, then preference is given to those pyridone dyes in the dye mixtures in which E is nitrogen and A is a radical of the formula C—$R^7$ where $R^7$ is as defined above.

Preference is further given to dye mixtures which include one or more pyridone dyes of the formula I where M is a radical of the formula IIa or IIc.

Preference is further given to dye mixtures which include one or more pyridone dyes of the formula I where $R^4$ is methyl.

Preference is further given to dye mixtures which include one or more pyridone dyes of the formula I where $R^5$ is cyano.

Preference is further given to dye mixtures which include one or more pyridone dyes of the formula I where $R^3$ is $C_3$–$C_{10}$-alkyl, preferably branched $C_3$–$C_{10}$-alkyl, especially $C_3$–$C_8$-alkyl, phenyl or thienyl.

Preference is further given to dye mixtures which include one or more pyridone dyes of the formula I where $R^6$ is $C_1$–$C_8$-alkyl, cyclopentyl, cyclohexyl or unsubstituted or $C_1$–$C_4$-alkyl- or $C_1$–$C_4$-alkoxy-substituted phenyl.

Preference is further given to dye mixtures which include one or more pyridone dyes of the formula I where $R^7$ is $C_1$–$C_{10}$-alkyl or unsubstituted or $C_1$–$C_4$-alkyl- or $C_1$–$C_4$-alkoxy-substituted phenyl.

Preference is further given to dye mixtures which include one or more pyridone dyes of the formula I where $R^1$ and $R^2$ are independently of each other $C_1$–$C_8$-alkyl with or without $C_1$–$C_4$-alkoxy, $C_1$–$C_4$-alkoxycarbonyl or phenyl substitution, cyclopentyl, cyclohexyl or prop-1-en-3-yl.

Particular preference is given to dye mixtures which include one or more pyridone dyes of the formula I where $R^3$ is branched $C_3$–$C_6$-alkyl, especially isopropyl, isobutyl or tert-butyl. tert-Butyl is particularly suitable.

Particular preference is further given to dye mixtures which include one or more pyridone dyes of the formula I where $R^6$ is $C_4$–$C_8$-alkyl or cyclohexyl.

Particular preference is further given to dye mixtures which include one or more pyridone dyes of the formula I where $R^7$ is $C_1$–$C_{10}$-alkyl.

Particular preference is further given to dye mixtures which include one or more pyridone dyes of the formula I where $R^1$ and $R^2$ are singly $C_1$–$C_8$-alkyl, $C_1$–$C_4$-alkoxy-$C_2$–$C_4$-alkyl, $C_1$–$C_4$-alkoxycarbonyl-$C_2$–$C_4$-alkyl, benzyl or prop-1-en-3-yl or one of $R^1$ and $R^2$ is $C_1$–$C_4$-alkyl and the other is cyclohexyl.

Very particular preference is given to dye mixtures which include one or more pyridone dyes of the formula I where $R^1$ and $R^2$ are independently of each other $C_1$–$C_8$-alkyl, benzyl or prop-1-en-3-yl.

Preference is further given to dye mixtures which include one or more anthraquinone dyes of the formula III where $L^1$ is hydrogen, $L^4$ is hydroxyl and $L^2$ and $L^3$ are each as defined above.

Preference is further given to dye mixtures which include one or more anthraquinone dyes of the formula III where $L^2$ and/or $L^3$ are each a radical of the formula

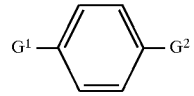

where $G^1$ and $G^2$ are each as defined above.

Particular preference is further given to dye mixtures which include one or more anthraquinone dyes of the formula IIIa

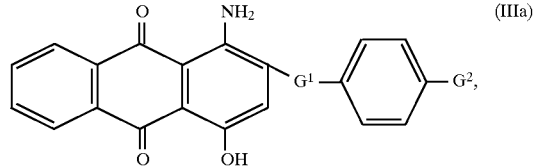

where $G^1$ and $G^2$ are each as defined above.

Preference is further given to dye mixtures which as well as the pyridone dyes of the formula I and the anthraquinone dyes of the formula III additionally include one or more azo dyes whose diazo component is selected from the group consisting of aminoisothiazole and anilines and whose coupling component is selected from the group consisting of aminothiazoles, anilines and tetrahydroquinolines.

Of particular suitability are azo dyes of the formula IV

where
D is a radical of the formula

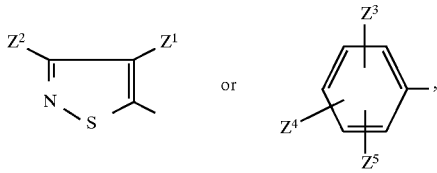

where
$Z^1$ is hydrogen, cyano, $C_1$–$C_8$-alkoxycarbonyl, $C_1$–$C_6$-alkanoyl, thiocyanato, halogen or nitro, $Z^2$ is cyano, unsubstituted or phenyl-substituted $C_1$–$C_6$-alkyl, unsubstituted or phenyl-substituted $C_1$–$C_{10}$-alkoxy, unsubstituted or phenyl-substituted $C_1$–$C_{10}$-alkylthio, unsubstituted or $C_1$–$C_4$-alkyl-, $C_1$–$C_4$-alkoxy-, halogen- or nitro-substituted phenyl, thienyl, $C_1$–$C_4$-alkylthienyl, pyridyl or $C_1$–$C_4$-alkylpyridyl and $Z^3$, $Z^4$ and $Z^5$ are each independently of the others, hydrogen, $C_1$–$C_6$-alkyl, $C_1$–$C_6$-alkoxy, halogen, nitro, cyano, unsubstituted or phenoxy-substituted $C_1$–$C_8$-alkoxycarbonyl, $C_1$–$C_8$-alkylsulfonyl or unsubstituted or $C_1$–$C_4$-alkyl-, $C_1$–$C_4$-alkoxy-, halogen- or nitro-substituted phenylsulfonyl, or $Z^3$ and $Z^4$ are together a radical of the formula CO—NW—CO where W is $C_1$–$C_{10}$-alkyl, with or without interruption by 1 or 2 oxygen atoms in ether function and with or without substitution by hydroxyl, and K is a radical of the formula

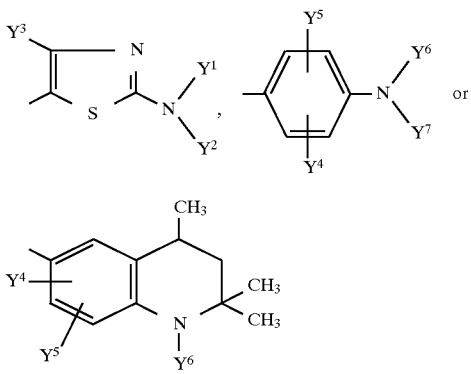

where
$Y^1$ and $Y^2$ are independently of each other $C_1$–$C_{10}$-alkyl with or without substitution by cyano, hydroxyl, halogen, $C_1$–$C_4$-alkanoyloxy, $C_1$–$C_4$-alkoxycarbonyl, $C_1$–$C_4$-alkoxycarbonyloxy, whose alkyl chain may in each case be interrupted by an oxygen atom in ether function, or phenyl and with or without interruption by from 1 to 4 oxygen atoms in ether function, $C_5$–$C_7$-cycloalkyl, $C_3$–$C_4$-alkenyl, unsubstituted or $C_1$–$C_4$-alkyl-, $C_1$–$C_4$-alkoxy-, halogen- or nitro-substituted phenyl, or together with the nitrogen atom joining them together form a 5- or 6-membered saturated heterocyclic radical with or with-out further hetero-atoms, $Y^3$ is $C_3$–$C_{10}$-alkyl, $C_5$–$C_7$-cycloalkyl, unsubstituted or $C_1$–$C_4$-alkyl-, $C_1$–$C_4$-alkoxy-, halogen- or nitro-substituted phenyl or thienyl, $Y^4$ is hydrogen, $C_1$–$C_{10}$-alkyl with or without interruption by 1 to 4 oxygen atoms in ether function, hydroxyl, $C_1$–$C_6$-alkoxy, especially methoxy or ethoxy, $C_1$–$C_4$-alkylsulfonylamino, mono- or di-($C_1$–$C_8$-alkyl)sulfonylamino or the radical —NHCOY$^8$ or —NHCO$_2$Y$^8$ where $Y^8$ is phenyl, benzyl, tolyl or $C_1$–$C_{10}$-alkyl with or without interruption by from 1 to 4 oxygen atoms in ether function, $Y^5$ is hydrogen, $C_1$–$C_6$-alkyl or $C_1$–$C_6$-alkoxy, and $Y^6$ and $Y^7$ are independently of each other hydrogen, $C_1$–$C_{10}$-alkyl with or without substitution by cyano, hydroxyl, halogen, $C_2$–$C_4$-alkanoyloxy, $C_1$–$C_4$-alkoxycarbonyl, $C_1$–$C_4$-alkoxycarbonyloxy, whose alkyl chain may be in each case be interrupted by an oxygen atom in ether function, or phenyl and with or with-out interruption by from 1 to 4 oxygen atoms in ether function, $C_5$–$C_7$-cycloalkyl, $C_3$–$C_4$-alkenyl, unsubstituted or $C_1$–$C_4$-, $C_1$–$C_4$-alkoxy-, halogen- or nitro-substituted phenyl, or together with the nitrogen atom joining them together a 5- or 6-membered saturated heterocyclic radical with or without further heteroatoms.

Of particular interest are azo dyes of the formula IV where
$Z^1$ is cyano or nitro,
$Z^2$ is unsubstituted or phenyl-substituted $C_1$–$C_6$-alkyl, unsubstituted or phenyl-substituted $C_1$–$C_6$-alkylthio or unsubstituted or $C_1$–$C_4$-alkyl-, $C_1$–$C_4$-alkoxy-, halogen- or nitro-substituted phenyl or thienyl, $Z^3$, $Z^4$ and $Z^5$ are each independently of the others hydrogen, $C_1$–$C_6$-alkyl, $C_1$–$C_6$-alkoxy, nitro, cyano or unsubstituted or phenoxy-substituted $C_1$–$C_6$-alkoxycarbonyl, or $Z^3$ and $Z^4$ are together a radical of the formula CO—NW—CO where W is as defined above, $Y^1$, $Y^2$, $Y^6$ and $Y^7$ are each independently of the others $C_1$–$C_6$-alkyl with or without substitution by hydroxyl, $C_1$–$C_4$-alkanoyloxy, $C_1$–$C_4$-alkoxycarbonyl, $C_1$–$C_4$-alkoxycarbonyloxy or phenyl and with or without interruption by 1 or 2 oxygen atoms in ether function, $Y^3$ is branched $C_3$–$C_{10}$-alkyl, and $Y^4$ is hydrogen, $C_1$–$C_4$-alkyl, methoxy, ethoxy or $C_1$–$C_6$-alkanoylamino.

In addition, dye mixtures are preferred in which the substituents in the formulae of the individual blending partners are selected from a combination of the preferred substituents listed above.

The dye mixtures of this invention typically include from 5 to 95% by weight, preferably from 20 to 80% by weight, especially from 40 to 60% by weight, based on the weight of the dye mixture, of one or more pyridone dyes of the formula I and also from 5 to 95% by weight, preferably from 20 to 80% by weight, especially from 40 to 60% by weight, based on the weight of the dye mixture, of one or more anthraquinone dyes of the formula III.

Dye mixtures additionally including azo dyes typically include from 5 to 45%, preferably from 40 to 60% by weight, based on the weight of pyridone and anthraquinone dyes, of azo dyes.

The novel dye mixtures are obtainable in a conventional manner, for example by blending the individual dyes in the abovementioned weight ratio.

The pyridone dyes of the formula I are known per se and are described for example in U.S. Pat. No. 5,079,365, WO-A-95/17 470, WO-A-95/22 581 or prior European Patent Application No. 96 101637.5 or are obtainable by the methods mentioned therein. The thermal transfer of these dyes is described for example in prior Patent Application EP-A-680 834.

The anthraquinone dyes of the formula III are likewise known per se and are described for example in K. Venkataraman "The Chemistry of Synthetic Dyes", Vol. III, pages 391 to 413, Academic Press, New York, London, 1970.

The azo dyes of the formula IV are likewise known per se and described for example in prior Patent Application WO-A-96 03462. Those azo dyes with a coupling component of the aniline series can likewise be obtained by the methods mentioned therein or else as described in U.S. Pat. No. 5,283,326.

The dye mixtures of this invention are notable for advantageous application properties. They exhibit high solubility in the ink ribbon (good compatibility with the binder), high stability in the printing ink, good transferability, high image stability (ie. good lightfastness and good stability to environmental effects, eg. moisture, temperature or chemicals) and ensure a flexible coloristic adaptation to the other subtractive primaries, giving rise to high quality color gamuts. In addition, the dye mixtures of this invention make it possible to produce good blacks.

Attention is drawn in particular to the spectrally uniform decrease in the individual components on irradiation; that is, the individual dye having the lower lightfastness typically does not decrease preferentially.

The present invention further provides a method of transferring dyes from a transfer to a plastic-coated paper by diffusion or sublimation with the aid of an energy source, which comprises using a transfer comprising a dye mixture as described in greater detail at the beginning.

To make the transfers required for the process of the present invention, the dye mixtures are incorporated in a suitable organic solvent or a mixture of solvents with one or more binders with or without auxiliaries to form a printing ink. This printing ink preferably contains the dyes in a molecularly disperse, ie. dissolved, form. The printing ink can be applied to the inert support by means of a doctor blade and air dried. Suitable organic solvents for the dye mixtures include for example those in which the solubility of the dye mixtures at a temperature of 20° C. is greater than 1% by weight, preferably greater than 5% by weight.

Examples are ethanol, propanol, isobutanol, tetrahydrofuran, methylene chloride, methyl ethyl ketone, cyclopentanone, cyclohexanone, toluene, chlorobenzene or mixtures thereof.

Suitable binders include all resins or polymer materials which are soluble in organic solvents and which are capable of binding the dye mixtures to the inert support sufficiently firmly as to prevent rubbing off. Preference is given to those binders which, after the air drying of the printing ink, include the dye mixture in the form of a clear, transparent film without any visible crystallization of the dye mixture.

Such binders are mentioned for example in U.S. Pat. No. 5,132,438 or the pertinent patent applications cited therein. Also suitable are saturated linear polyesters.

Preferred binders include ethylcellulose, ethylhydroxyethylcellulose, polyvinyl butyral, polyvinyl acetate, cellulose propionate or saturated linear polyesters.

The weight ratio of binder:dye mixture is generally from 1:1 to 10:1.

Suitable auxiliaries include for example release agents as mentioned in U.S. Pat. No. 5,132,438 or the pertinent patent applications cited therein. Also suitable are especially organic additives which prevent the crystallizing out of the transfer dyes in the course of storage or on heating of the ink ribbon, for example cholesterol or vanillin.

Suitable inert supports are described for example in U.S. Pat. No. 5,132,438 or the pertinent patent applications cited therein. The thickness of the support generally ranged from 3 to 30 μm, preferably from 5 to 10 μm.

Suitable dye receiver layers include in principle all thermally stable polymeric layers with affinity for the dyes to be transferred, for example modified polycarbonates or polyesters. Further details can be found for example in U.S. Pat. No. 5,132,438 or the pertinent patent applications cited therein.

The transfer is effected by means of an energy source, for example by means of a laser or a thermal head, for which the latter has to be heatable to a temperature of $\geq 300°$ C. so that the transfer of the dye can take place within the time range $t: 0 < t < 15$ msec. The dye migrates out of the transfer sheet and diffuses into the surface coating of the receiving medium.

The dye mixtures of this invention are also advantageously useful for dyeing or printing synthetic materials (including when using the ink-jet method), for example polyesters, polyamides or polycarbonates. Particularly suitable are textile materials, such as fibers, yarns, threads, knits, wovens or nonwovens composed of polyester, modified polyester, for example anionically modified polyester, or blends of polyester with cellulose, cotton, viscose or wool. The dyeing and printing conditions are known per se and also include dyeing in supercritical carbon dioxide. The dyes of this invention can also be used for dyeing keratinous fibers, for example in hair dyeing or the dyeing of furs.

The novel dye mixtures are further advantageously useful for manufacturing color filters as described for example in EP-A-399 473.

Finally, they can also be used with advantage as colorants for making toners for electrophotography.

The Examples which follow illustrate the invention.

Tables 1 to 4 below list the individual dyes used as blending partners.

TABLE 1

![Structure with R1R2N-C(=N)-S-CH=C(R3)-ring with CH3, CN, =O, N-R6]

| Dye No. | NR$^1$R$^2$ | R$^3$ | R$^6$ |
|---|---|---|---|
| 1 | N(C$_4$H$_9$)$_2$ | C(CH$_3$)$_3$ | CH$_3$ |
| 2 | N(C$_4$H$_9$)$_2$ | C(CH$_3$)$_3$ | C$_4$H$_9$ |
| 3 | N(C$_4$H$_9$)$_2$ | C(CH$_3$)$_3$ | C$_2$H$_4$OCH$_3$ |
| 4 | N(C$_4$H$_9$)$_2$ | C(CH$_3$)$_3$ | C$_3$H$_6$OCH$_3$ |
| 5 | N[CH(CH$_3$)C$_2$H$_5$]$_2$ | C(CH$_3$)$_3$ | CH$_3$ |
| 6 | N[CH(CH$_3$)C$_2$H$_5$]$_2$ | C(CH$_3$)$_3$ | C$_4$H$_9$ |
| 7 | N(C$_2$H$_5$)$_2$ | C(CH$_3$)$_3$ | CH(CH$_3$)C$_2$H$_5$ |
| 8 | N(C$_2$H$_5$)$_2$ | C(CH$_3$)$_3$ | CH$_3$ |

TABLE 2

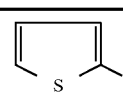

| Dye No. | NR$^1$R$^2$ | R$^3$ | R$^7$ |
|---|---|---|---|
| 9 | N(C$_2$H$_5$)$_2$ | (thiophene) | CH(C$_2$H$_5$)C$_4$H$_9$ |
| 10 | N(C$_4$H$_9$)$_2$ | C(CH$_3$)$_3$ | CH(C$_2$H$_5$)C$_4$H$_9$ |

TABLE 3

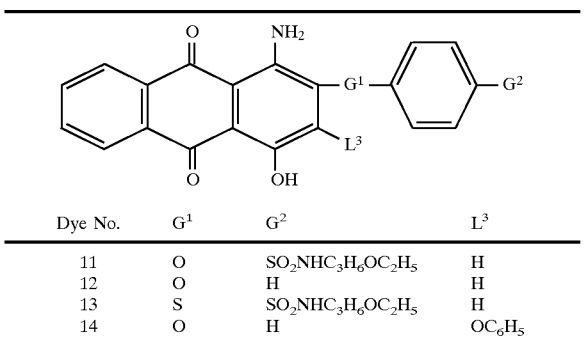

| Dye No. | G¹ | G² | L³ |
|---------|----|----|-----|
| 11 | O | SO$_2$NHC$_3$H$_6$OC$_2$H$_5$ | H |
| 12 | O | H | H |
| 13 | S | SO$_2$NHC$_3$H$_6$OC$_2$H$_5$ | H |
| 14 | O | H | OC$_6$H$_5$ |

TABLE 4

D—N=N—K

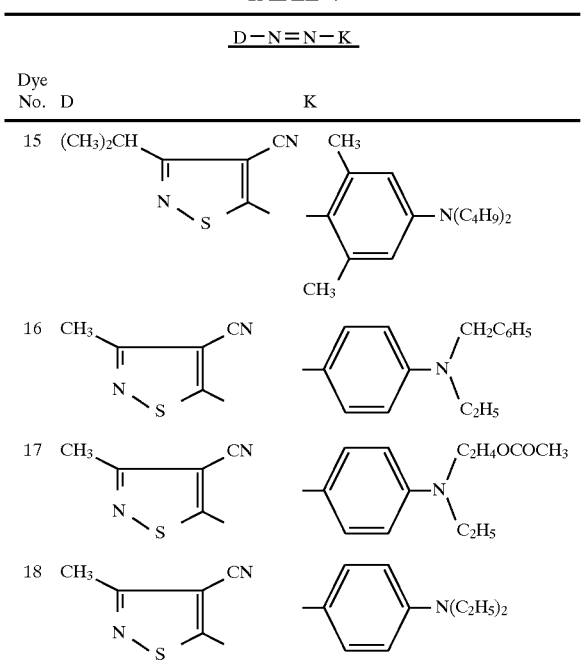

Procedure for thermal transfer a) 10 g of dye mixture are stirred, if necessary with brief heating to 80°–90° C., into 100 g of a 10% strength by weight solution of a binder based on polyvinyl butyral in 4.5:2:2 v/v/v methyl ethyl ketone/toluene/cyclohexanone.

The mixture is applied with a 10 μm doctor blade to a 6 μm thick polyester film which has a suitable slipping layer on the back and is blow-dried with a hair dryer in the course of 1 minute. Before the ink ribbon can be printed, it has to air dried for at least a further 24 hours, since residual solvent can impair the printing process.

b) The ink ribbons are printed on experimental computer-controlled apparatus equipped with a commercial thermal printing head onto commercial color video print paper (Hitachi).

The voltage is altered to control the energy emitted by the thermal printing head, the length of a pulse having been set to 7 ms and only one pulse being emitted at a time. The emitted energy ranges from 0.5 to 2.0 mJ/dot.

Since the depth of color is directly proportional to the supplied energy, it is possible to produce a color wedge for spectroscopic evaluation.

The depth of color is plotted against the supplied energy per heating element to determine the Q* value (=energy in mJ for the absorbance value of 1) and the gradient m in 1/mJ.

The results obtained are shown together with the $\lambda_{max}$ values (measured on the video print paper) below in Table 5.

TABLE 5

| Mixture of dyes | Weight ratio | $\lambda_{max}$ [nm] | Q* [mJ/dot] | m* [1/mJ] |
|-----------------|--------------|-----------|-------------|-----------|
| 1/11 | 3:1 | 536 | 0.80 | 3.04 |
| 1/11 | 2:1 | 536 | 0.81 | 2.96 |
| 1/11 | 1:1 | 536 | 0.87 | 2.53 |
| 1/11/13 | 1:1:1 | 537 | 0.98 | 2.18 |
| 2/11 | 3:1 | 537 | 0.91 | 2.46 |
| 2/11 | 2:1 | 537 | 0.86 | 2.91 |
| 2/11 | 1:1 | 537 | 0.89 | 2.58 |
| 2/12 | 1:1 | 537 | 0.82 | 3.41 |
| 2/13 | 1:1 | 536 | 0.95 | 2.86 |
| 3/11/13 | 1:1:1 | 537 | 0.99 | 2.24 |
| 4/12 | 1:1 | 537 | 0.81 | 3.36 |
| 4/11/13 | 1:1:1 | 537 | 1.06 | 1.91 |
| 5/11/13 | 1:1:1 | 537 | 1.07 | 2.01 |
| 6/11/13 | 1:1:1 | 538 | 1.06 | 1.78 |
| 7/11/13 | 1:1:1 | 534 | 1.04 | 1.75 |
| 8/12 | 1:1 | 537 | 0.84 | 3.31 |
| 8/13 | 1:1 | 536 | 0.91 | 2.62 |
| 9/11/13 | 1.5:1:1.5 | 569 | 1.32 | 1.39 |
| 10/12/14 | 1:1:1 | | 0.92 | 2.56 |

Good results are also obtained with the dye mixtures listed below in Table 6.

TABLE 6

| Mixture of dyes | Weight ratio | Q* [mJ/dot] | m* [1/mJ] |
|-----------------|--------------|-------------|-----------|
| 1/12/14 | 1:1:1 | 1.10 | [1/mJ] |
| 2/14/16 | 1:1:1 | 0.87 | 2.60 |
| 2/14/17 | 1:1:1 | 0.88 | 2.81 |
| 6/12/18 | 1:1:1 | 0.86 | 2.76 |
| 10/12/17 | 1:1:0.5 | 0.90 | 2.99 |

We claim:

1. A dye mixture, comprising one or more pyridone dyes of the formula I:

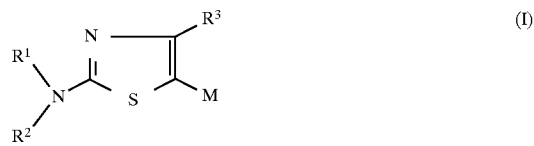

where

M is a radical of the formula

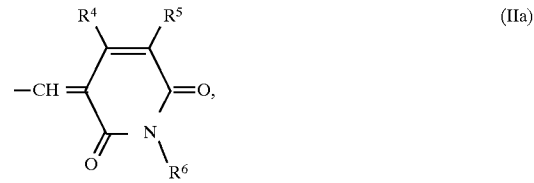

-continued

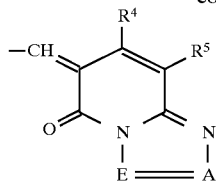
(IIb)

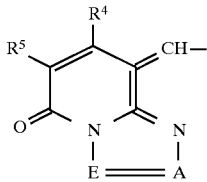
(IIc)

wherein:

$R^1$ and $R^2$ are independently of each other $C_1$–$C_{10}$-alkyl with or without substitution by $C_1$–$C_4$-alkoxycarbonyl, $C_1$–$C_4$-alkoxycarbonyloxy, whose alkyl chain may in each case be interrupted by an oxygen atom in ether function, or phenyl and with or without interruption by from 1 to 4 oxygen atoms in ether function, $C_5$–$C_7$-cycloakyl, $C_3$–$C_4$-alkenyl, unsubstituted or $C_1$–$C_4$-alkyl- $C_1$–$C_4$-alkoxy-, halogen- or nitro-substituted phenyl, or together with the nitrogen atom joining them together a 5- or 6-membered saturated heterocyclic radical with or without further heteroatoms, $R^3$ is tert-butyl, $R^4$ is hydrogen, $C_1$–$C_6$-alkyl or unsubstituted or $C_1$–$C_4$-alkyl-, $C_1$–$C_4$-alkoxy-, halogen- or nitro-substituted phenyl, $R^5$ is cyano, carbamoyl, mono- or di($C_1$–$C_8$-alkyl) carbamoyl, carboxyl, $C_1$–$C_8$-alkoxycarbonyl or benzimidazolyl, $R^6$ is $C_1$–$C_{10}$-alkyl with or without substitution by phenyl, phenoxy, cyclohexyloxy or pyrazolyl and with or without interruption by from 1 to 4 oxygen atoms in ether function, $C_5$–$C_7$-cycloalyl, unsubstituted or $C_1$–$C_4$-alkyl-, $C_1$–$C_4$-alkoxy-, halogen- or nitro- substituted phenyl or a radical of the formula $NB^1B^2$, where $B^1$ and $B^2$ are independently of each other hydrogen, $C_1$–$C_{10}$-alkyl, unsubstituted or $C_1$–$C_4$-alkyl-, $C_1$–$C_4$-alkoxy-, halogen- or nitro-substituted phenyl, $C_1$–$C_9$-alkanoyl, $C_1$–$C_8$-alkyl-sulfonyl, unsubstituted or $C_1$–$C_4$-alkyl-, $C_1$–$C_4$-alkoxy-, halogen- or nitro-substituted benzoyl, pyridylcarbonyl or thienylcarbonyl, and one of the two radicals A or E is nitrogen and the other is a radical of the formula C—$R^7$, where $R^7$ is $C_1$–$C_{10}$-alkyl with or without substitution by phenyl, phenoxy, cyclohexyloxy or pyrazolyl and with or without interruption by from 1 to 4 oxygen atoms in ether function, $C_5$–$C_7$-cycloalkyl or unsubstituted or $C_1$–$C_4$-alkyl-, $C_1$–$C_4$-alkoxy-, halogen- or nitro-substituted phenyl, and one or more anthraquinone dyes of the formula III

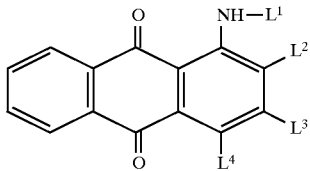
(III)

where $L^1$ is hydrogen, $C_1$–$C_{10}$-alkyl or unsubstituted or $C_1$–$C_4$-alkyl-, $C_1$–$C_4$-alkoxy-, halogen- or nitro-substituted phenyl, $L^2$ and $L^3$ are independently of each other hydrogen, unsubstituted or phenyl- or $C_1$–$C_4$-alkylphenyl-substituted $C_1$–$C_{10}$-alkoxy, unsubstituted or phenyl-substituted $C_1$–$C_{10}$-alkylthio, halogen, hydroxyphenyl, $C_1$–$C_4$-alkoxyphenyl or a radical or the formula

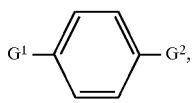

where $G^1$ is oxygen or sulfur and $G^2$ is hydrogen or $C_1$–$C_8$-monoalkylsulfamoyl whose alkyl chain may be interrupted by 1 or 2 oxygen atoms in ether function with the proviso that either $L^2$ or $L^3$ is a radical of the formula,

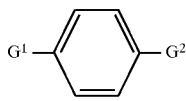

and $L^4$ is amino, hydroxyl or unsubstituted or phenyl-substituted $C_1$–$C_{10}$-alkylthio.

2. The dye mixtures as claimed in claim 1, wherein $R^4$ is methyl.

3. The dye mixtures as claimed in claim 1, wherein $R^6$ is $C_1$–$C_8$-alkyl, cyclopentyl, cyclohexyl or unsubstituted or $C_1$–$C_4$-alkyl- or $C_1$–$C_4$-alkoxy-substituted phenyl.

4. The dye mixtures as claimed in claim 1, wherein $R^7$ is $C_1$–$C_{10}$-alkyl or unsubstituted or $C_1$–$C_4$-alkyl- or $C_1$–$C_4$-alkoxy-substituted phenyl.

5. The dye mixtures as claimed in claim 1, wherein $L^1$ is hydrogen, $L^4$ is hydroxyl and $L^2$ and $L^3$ are each as defined in claim 1.

6. The dye mixtures as claimed in claim 1, further comprising one or more azo dyes whose diazo component is selected from the group consisting of the aminoisothiazoles and anilines and whose coupling component is selected from the group consisting of the aminothiazoles, anilines and tetrahydroquinolines.

* * * * *